US009307579B2

(12) United States Patent
Schall

(10) Patent No.: US 9,307,579 B2
(45) Date of Patent: Apr. 5, 2016

(54) TRANSPARENT WINDOW WITH AN ELECTRICALLY HEATABLE COATABLE

(75) Inventor: Guenther Schall, Kreuzau, DE (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 819 days.

(21) Appl. No.: 12/680,809

(22) PCT Filed: Oct. 16, 2008

(86) PCT No.: PCT/EP2008/008775

§ 371 (c)(1), (2), (4) Date: Mar. 30, 2010

(87) PCT Pub. No.: WO2009/049890

PCT Pub. Date: Apr. 23, 2009

(65) Prior Publication Data

US 2010/0213183 A1 Aug. 26, 2010

(30) Foreign Application Priority Data

Oct. 18, 2007 (DE) ......................... 10 2007 050 286

(51) Int. Cl.
*B60L 1/02* (2006.01)
*H05B 3/84* (2006.01)

(52) U.S. Cl.
CPC ............ *H05B 3/84* (2013.01); *H05B 2203/013* (2013.01)

(58) Field of Classification Search
CPC ................... B32B 17/10036; B32B 17/10183; H05B 3/84; H05B 3/86
USPC ......... 219/203, 541, 542, 546, 543, 520, 522, 219/548, 213, 219, 488, 476, 477, 478, 219/544; 49/130, 360, 413, 348, 162, 61, 49/70, 72, 26, 280, 375; 29/611, 620, 816, 29/854, 897.2, 852, 428; 428/34, 38, 428/299.1, 500, 172; 343/702, 703, 704, 343/712, 713, 793
See application file for complete search history.

(56) References Cited

U.S. PATENT DOCUMENTS

| | | | | |
|---|---|---|---|---|
| 2,557,983 | A | 6/1951 | Linder | |
| 4,158,718 | A * | 6/1979 | Kehl et al. | 428/461 |

(Continued)

FOREIGN PATENT DOCUMENTS

| | | | |
|---|---|---|---|
| DE | 1 256 812 | | 12/1967 |
| DE | 29 36 398 | A1 | 3/1981 |
| DE | 38 28 526 | A1 | 3/1990 |
| DE | 40 19 703 | A1 | 7/1991 |
| DE | 10 2004 005 611 | A1 | 9/2005 |

(Continued)

OTHER PUBLICATIONS

Office Action dated Apr. 23, 2015, corresponding to Indian Application No. 1134/KOLNP/2010.

*Primary Examiner* — Phuong Nguyen
(74) *Attorney, Agent, or Firm* — Oblon, McClelland, Maier & Neustadt, L.L.P.

(57) ABSTRACT

A transparent window (1) has an electrically heatable coating, which extends over a substantial part of the area of the window (1), in particular over its viewing area (A). In addition, the coating is electrically connected to at least two mutually opposite low-impedance bus bars in such a way that, after an electrical feed voltage has been applied to the bus bars, a current flows between them over a heating area (21) formed by the coating. In this arrangement, there is between the bus bars and the heating area (21) at least one at least partially light-transmitting transitional region (15), the effective surface resistance of which is lower than the surface resistance of the coating. In order to obtain a transitional region (15) having the visual appearance of a band filter, it is proposed that the surface resistance in the at least one transitional region (15) increases in the direction from the assigned bus bar to the heating area (21).

19 Claims, 5 Drawing Sheets

(56) References Cited

U.S. PATENT DOCUMENTS

Figure 1:
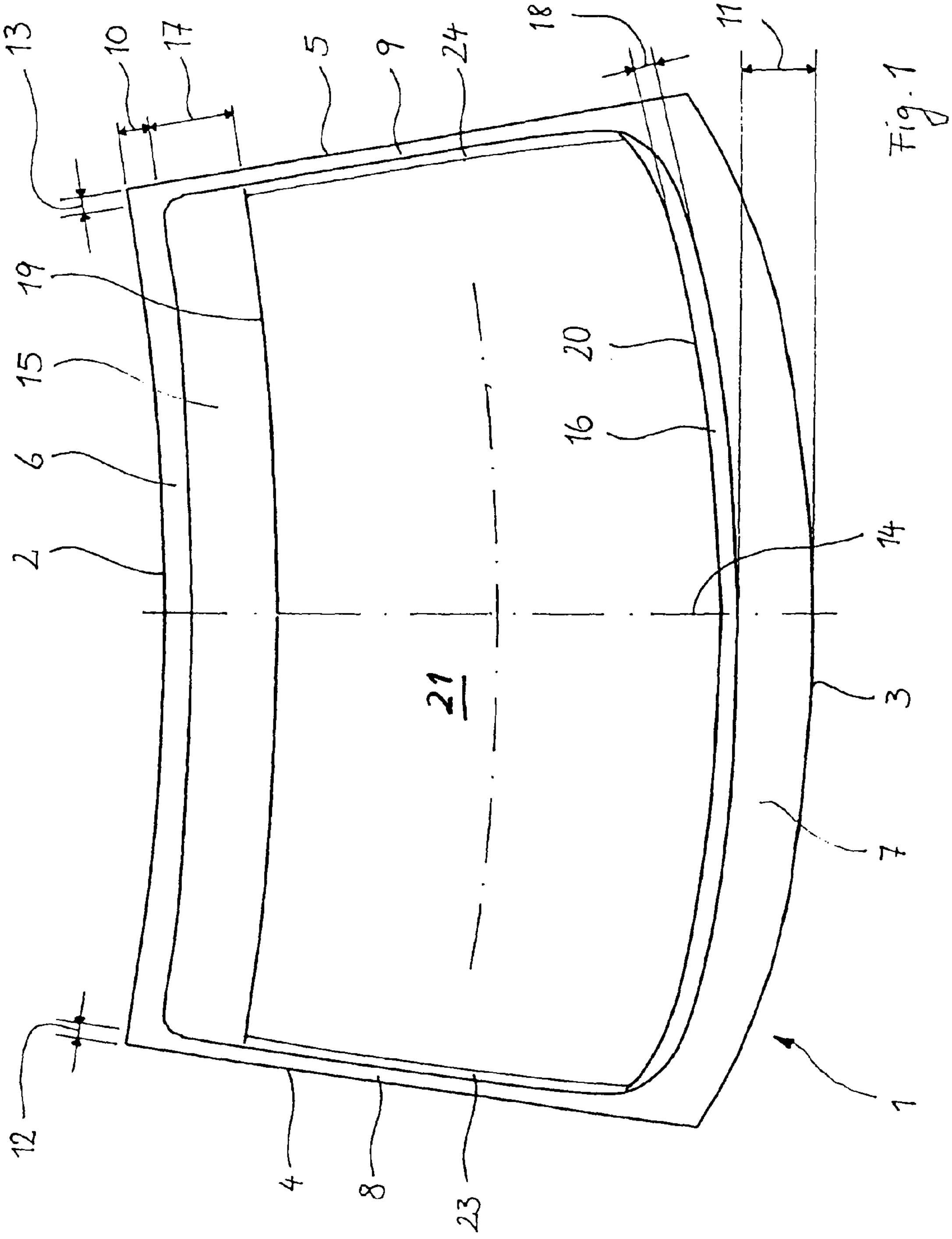

| | | | | |
|---|---|---|---|---|
| 5,496,989 | A * | 3/1996 | Bradford et al. | 219/497 |
| 2002/0015824 | A1 * | 2/2002 | Kawamoto et al. | 428/156 |
| 2006/0011596 | A1 * | 1/2006 | Sharp et al. | 219/203 |
| 2007/0152895 | A1 * | 7/2007 | Heuser et al. | 343/713 |
| 2011/0062139 | A1 * | 3/2011 | Schmidt et al. | 219/203 |

FOREIGN PATENT DOCUMENTS

| | | | | |
|---|---|---|---|---|
| DE | WO2006040498 | A1 * | 4/2006 | H05B 3/84 |
| DE | 20 2005 016 384 | | 2/2007 | |
| DE | 202005016384 | * | 2/2007 | B32B 17/10036 |
| WO | WO 2006/030165 | A1 | 3/2006 | |

* cited by examiner

TRANSPARENT WINDOW WITH AN ELECTRICALLY HEATABLE COATABLE

The invention relates to a transparent window with an electrically heatable coating, which extends over a substantial part of the area of the window, in particular over its viewing area (A), and is electrically connected to at least two mutually opposite low-impedance bus bars in such a way that, after an electrical feed voltage has been applied to the bus bars, a current flows between them over a heating area formed by the coating, wherein there is between the bus bars and the heating area an at least partially light-transmitting transitional region, the effective surface resistance of which is lower than the surface resistance of the coating.

In the motor vehicle sector, there is an increasing demand for front windows in particular also to be provided with heatable forms in which the heating area does not have any wires or other visible conductors. Statutory regulations require that visible elements which detract from the view through the window are not admissible, in particular in the very significant viewing area (A) of a windscreen. For this reason, the heating area is increasingly being provided in the form of a heatable transparent coating of the window.

A general problem of heatable coatings with low light absorption is the still relatively high surface resistance. In particular in the case of large dimensions of the window to be heated or in the case of long flow paths, this leads to the requirement for a comparatively high operating voltage. With the standard 12 to 14 volt electrical systems of customary passenger cars, however, adequate heating power cannot be achieved for the customary windscreen dimensions and surface resistances of customary heating coatings. Until now, lowering the surface resistance in the case of the layer systems used is always accompanied by a reduction in the transmission of visible light, since in this case it is assumed that the thickness of the conductive layers has to be increased.

The aforementioned problem is also addressed, for example, by DE 20 2005 016 384 U1, which discloses a heatable windscreen of the type described at the beginning in which a transparent transitional region that is electrically connected directly to the respective bus bar is provided along one or both bus bars. The two transitional regions in strip form are in this case located on the one hand above and on the other hand below the central viewing area (A), the optical properties of which therefore remain uninfluenced (in comparison with the transitional region). The lowering of the surface resistance in the transitional region is achieved in the case of the known windscreen by additional conductor or grid elements extending from the two bus bars, perpendicularly in relation to them, and into the heating area formed by the coating. These elements are located in the viewing area (B) of the window, but end before the viewing area (A). On account of the increased conductivity of the additional grid elements, also referred to as "comb electrodes", the two transitional regions provided with the grid elements consequently form a region with increased effective electrical conductivity, i.e. reduced effective electrical surface resistance. In these regions, parallel connections of the coating itself and the grid elements are created.

Furthermore, DE 1 256 812 also describes a heatable vehicle window in which the bus bars extend on the narrow sides of the window, i.e. in the present case on the approximately vertically running narrow sides of a rear vehicle window. From the two bus bars there extend horizontally running comb electrodes, which extend into a heating area formed by a transparent coating. The comb electrodes of the opposing bus bars are arranged offset in relation to one another by half their vertical spacing, so that a comb electrode on one bus bar runs midway between adjacent comb electrodes of the other bus bar. By minimizing the spacing of electrodes of opposite polarity, the distance that the current has to cover through the electrically conductive coating is reduced, in order in this way to obtain even with low voltages a heating power over the entire window that is as great as possible and also homogeneously distributed.

Furthermore, a transparent window with a viewing area that can be partially darkened is known from DE 10 2004 005 611 A1. The darkening takes place in this case by the transmission properties of the window, provided in the form of a multilayered composite, being reversibly changed with the aid of an electrochromic functional layer, which is enclosed between two surface electrodes. A feed voltage from the electrical system of the vehicle can be fed into the surface electrodes via low-impedance connectors. In the case of DE 10 2004 005 611 A1, the surface electrodes and their connectors can be made to match one another and spatially arranged in relation to one another in such a way that, with a first applied voltage, darkening begins at one edge of the window and, with an increasing voltage, it continues over the surface area of the window continuously until there is completely homogeneous transformation of the functional element at the opposite edge. In this way, a kind of "roller blind effect" is achieved when darkening the functional element, which is provided in particular in the form of a horizontal strip beginning from the upper edge of a windscreen.

All known systems for heating windows with the aid of heating areas provided in the form of transparent coatings are to be regarded as problematic—when using a feed voltage directly from the 12 volt electrical system of a vehicle—with respect to the achievable heating power—while at the same time ensuring sufficiently good transmission properties.

Problem

The invention addresses the problem of providing a transparent window, with a transparent coating that is electrical heatable and forms a heating area, with which a sufficiently great heating power is provided even in the case of a comparatively low feed voltage, the electrical properties of the window being good, even outside the viewing area (A) and the viewing area (B), and the window having a pleasing design.

Solution

On the basis of a window of the type described at the beginning, this problem is solved according to the invention by the surface resistance in the at least one transitional region increasing in the direction from the assigned bus bar to the heating area.

The invention is based on the finding that the transitional region typically comprises—as is also the case in DE 10 2005 016 384 U1—opaque electrically conducting regions (comprising for example electrically conducting, silver-containing screen printing paste or thin electrically conducting wires) and electrically nonconducting or at least significantly poorer conducting regions, which on the other hand have good transmission properties for the range of visible light. Alternatively, the conductivity of the window may also be produced by a conductive coating—which itself is transparent—the transmission coefficient decreasing with increasing thickness of the coating, so that with great layer thickness quasi-opaque regions can be created. The invention provides a window in which the transitional region does not have homogeneous electrical and optical properties over its entire height. Since optical transparency and conductivity are typically inversely proportional to each other, the invention provides highly conductive, but less transparent structures in the regions that are very close to the respective bus bar, whereas, with increasing distance from the bus bars, but greater proximity to the central viewing area (A), the electrical conductivity properties are sacrificed more and more in favour of the optical properties of the window. As a result, a transitional region of the window that has optical properties like a sun visor integrated in the window, with transparency increasing towards the middle of the window, is consequently obtained. In the field of vehicle windows, such designs are also known moreover as so-called band filters, which are created by colouring the PVB intermediate film used in the case of laminated safety windows. Furthermore, to cover the beads of adhesive for joining the window to the body, it is known to print black ink onto the surface of the window. The known black print is formed, however, by conventional black screen printing ink, which does not have any electrical conductivity. On the other hand, black print structures often run out as a dot pattern with dots of decreasing size, so that, even assuming electrical conductivity of the screen printing paste, lack of cohesion of the printed-on structures would mean that there would not be conductivity right up to their lower edge.

The transitional region preferably comprises opaque, electrically conductive conducting regions and transparent electrically nonconducting free regions, it also being possible for the latter to have a certain conductivity if there is also a transparent conductive coating on the transitional region. As an alternative to this, however, it is also possible that the effective surface resistance, increasing towards the viewing area (A), is reduced by the thickness of an electrical conductor heating coating being varied. While the thickness of the coating adjoining the viewing area (A) corresponds to the thickness in the viewing area (A), i.e. is comparatively very small, it increases continuously towards the respective bus bar, to be precise to such a degree that in the vicinity of the bus bar there is virtually no longer any transparency. The great application thickness of the electrically conductive layer has the effect that the conductivity properties are improved such that the overall resistance that is formed by the transitional region is significantly reduced in comparison with the coating thickness in the viewing area (A).

According to an advantageous development of the window according to the invention, it is provided that the conducting regions have a plurality of conductor paths, which are respectively connected in an electrically conducting manner at one end to the bus bar and at least at an opposite end to the coating. In order in this case to give the transitional region as far as possible the optical characteristics of a "sun visor", with transparency increasing towards the middle of the window, at least one transverse path may be respectively arranged between adjacent conductor paths and connected to them in an electrically conducting manner, also allowing, by a possible flow of current transversely in relation to the actual conductor paths, interruptions of the latter to be bridged in an electrical respect.

The desired optical characteristics of optical transparency increasing towards the middle of the window can also be achieved in particular by the width of the conductor paths decreasing from the respective bus bar to the coating. The decrease may in this case take place constantly (the conductor paths form for example acute-angled triangles) or else irregularly in any desired way, the lateral delimiting lines of the conductor paths being able to take the forms of any desired curves.

According to a particularly advantageous embodiment of the window according to the invention, it is proposed to form the free regions as islands that are enclosed on all sides by conducting regions or conductor paths. This has the effect that the conductor paths are maintained in their form throughout and the islands define the clear spacing of adjacent conductor paths. The regions located between adjacent conductor paths, which likewise adjoin the islands, thereby form transverse paths and, on account of electrical connections between adjacent conductor paths, lead to an increase in fail safety.

The conductor paths may, for example, run in a meandering or zigzag form and in peak or crest portions are connected in an electrically conducting manner to peak or crest portions of conductor paths that are respectively adjacent and follow a mirror image path.

Furthermore, the size of the islands of the transitional region may increase from 0 at the border with the bus bar continuously with increasing distance from the latter, the conductor path portions that remain between adjacent islands at the border with the heating area having a width of between 0.2 mm and 1.0 mm. The decrease in conductor path width towards the heating region has the effect that the optical transparency in the transitional region becomes increasingly greater away from the bus bar, resulting in an appearance that is visually very pleasing.

Furthermore, it is provided that the width of the conductor path portions at the border to the heating area is at most between 3% and 20% of the width of the adjacent islands. This measure also helps to create a visually very attractive appearance while at the same time retaining good conductivity properties in the transitional region.

Finally, a refinement of the invention provides that in the at least one transitional region (as in the heating area) there is likewise an electrically conductive, transparent coating. While in principle there is the possibility of keeping the specific heating power low in the transitional region in comparison with the heating area in the viewing area (A), alternatively a heating power that is comparable to that in the actual central heating area may also already be achieved in the transitional region. In this special case, the transitional region may be regarded as part of the heating area.

EXEMPLARY EMBODIMENTS

Figure 2:
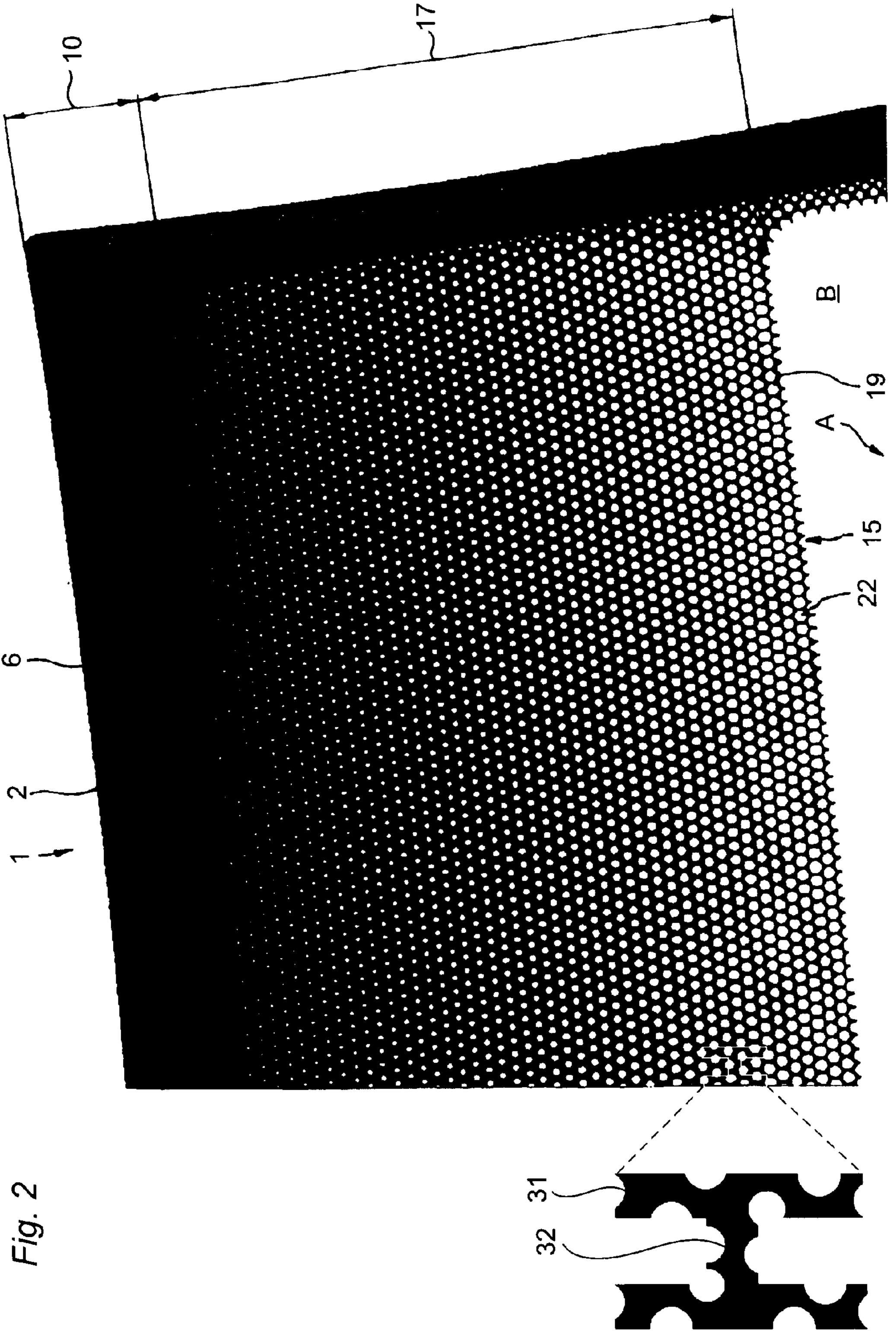
Figure 3:
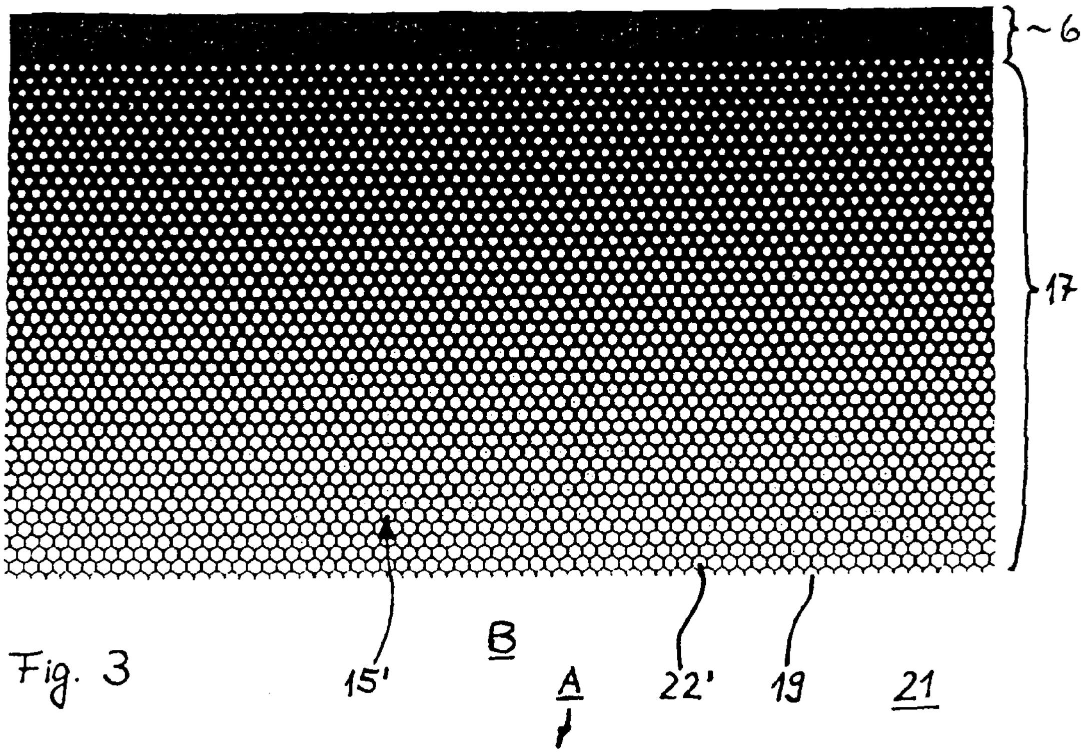

The invention is explained in more detail below on the basis of two exemplary embodiments of a window according to the invention:

In the drawing:

FIG. 1 shows a plan view of a window provided in the form of a windscreen of a passenger car FIG. 2 shows an enlarged detail of an upper transitional region of the window according to FIG. 1 and FIG. 3 shows a detail from an upper transitional region of an alternative window.

Figure 4:
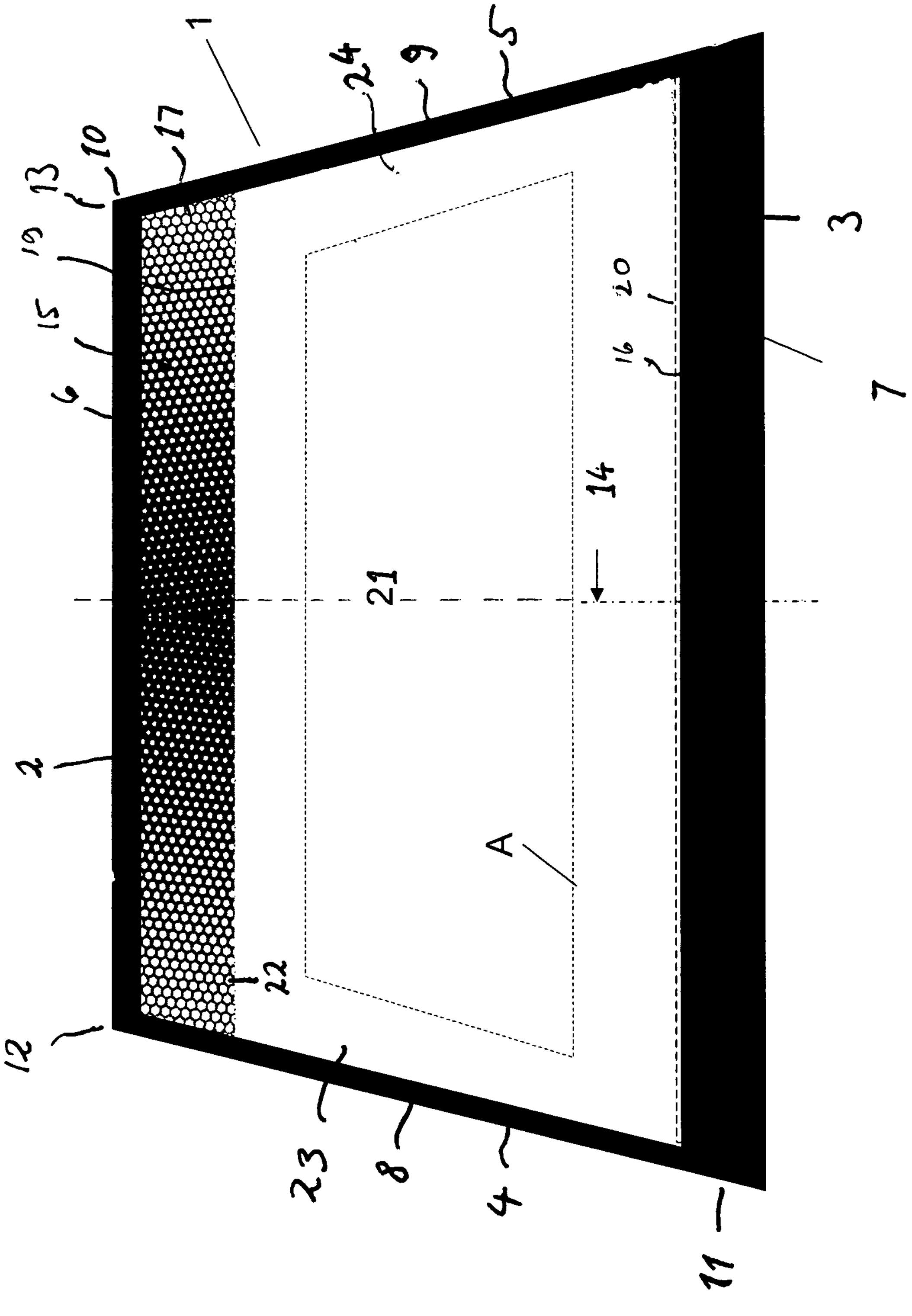
Figure 5:
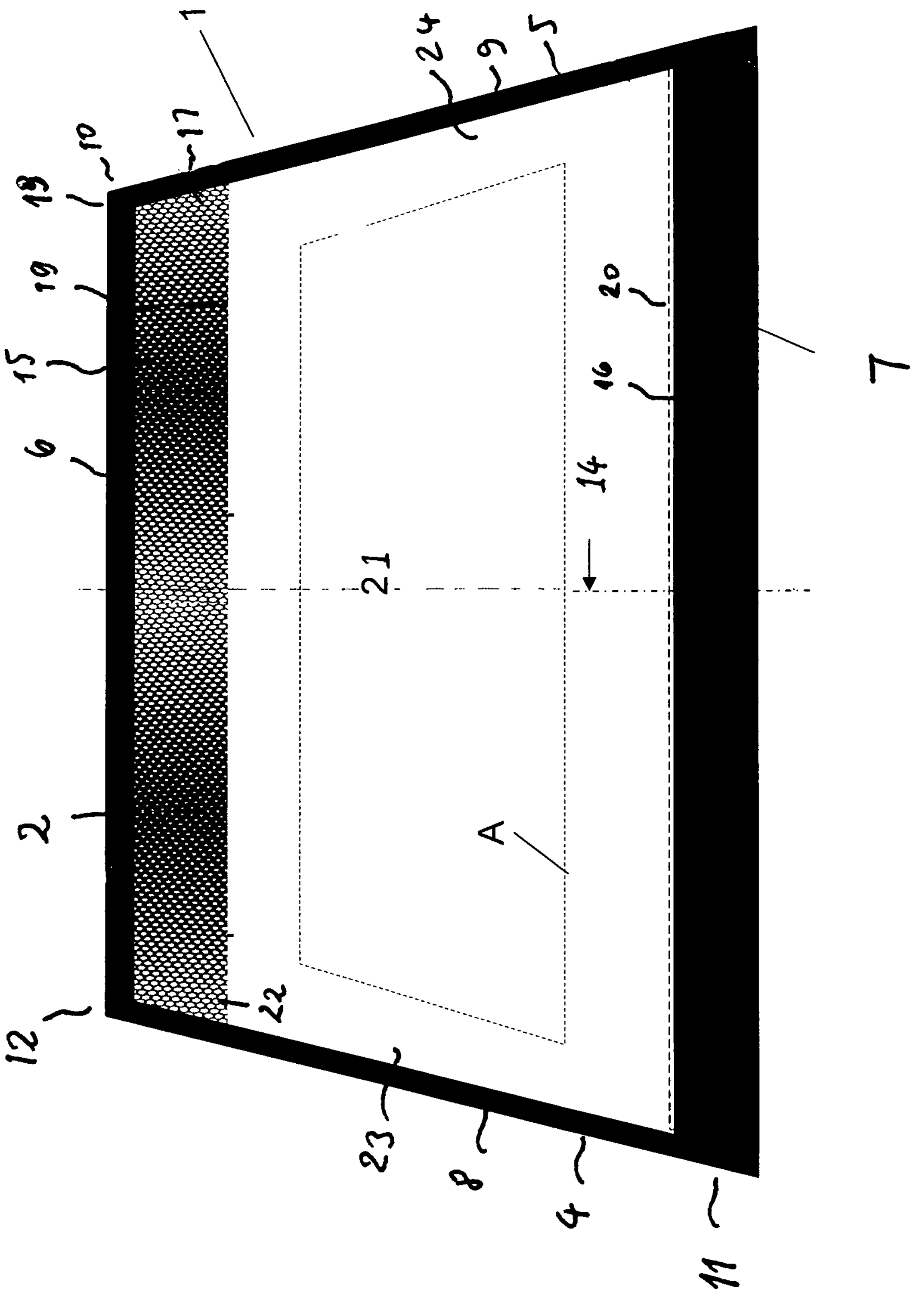

FIG. 4 shows a plan view of a window provided in the form of a windscreen of a passenger car FIG. 5 shows a plan view of a window provided in the form of a windscreen of a passenger car A window 1, represented in FIG. 1, of a passenger car has an upper edge 2, a lower edge 3, facing a bonnet, and two edges 4 and 5, facing lateral A pillars. Starting from all the edges 2 to 5, the window 1 has in each case edge strips 6, 7, 8 and 9, which respectively have a width 10, 11, 12 and 13, the width 11 being the greatest in the region of a centre line 14 and decreasing in the direction of the edge strips 8 and 9 (see FIG. 1).

The strips 6, 7, 8 and 9 are produced from black screen printing paste, which is applied on "side 2" of the window 1 made up of an outer pane and an inner pane and a PVB adhesive film layer lying in between. The edge strips 6, 7, 8 and 9 of black print correspond to the prior art and serve in particular for covering the bead of adhesive located thereunder, with which the window 1, i.e. its "side 4", is held in the window frame of the body surrounding it.

Under the upper edge strip 6 there is the upper transitional region 15, running parallel to the said upper strip. Above the lower edge strip 7 there is the lower transitional region 16, likewise running parallel to the said lower strip. The upper transitional region 15 has approximately the same width 17 over its entire length. The same applies to the lower edge strip 16, the width of which is denoted by 18.

Adjoining the lower edge 19 of the upper transitional region 15 and adjoining the upper edge 20 of the lower transitional region 16 there is initially the viewing area (B) and, further towards the centre of the window 1, the central viewing area (A), in the present case both viewing areas (A) and (B) and similarly the transitional regions 15 and 16 being provided with a transparent electrically conductive coating on "side 3" of the window. The actual heating area 21 is located between the mutually facing edges 19 and 20 of the two transitional regions 15 and 16.

Details of the transitional region 15 can be better seen from the enlarged representation according to FIG. 2. Conducting regions of the transitional region 15 that are applied on "side 3" of the window and shown in black in the drawing, and are also opaque in reality (for example consist of silver-containing screen printing paste), are interrupted by a multiplicity of free regions, which are transparent and shown in white. The free regions are provided in the form of approximately circular islands 22, which are arranged in rows parallel to one another. With increasing distance of the rows respectively running parallel to the edge 2 of the window from that edge 2, the size of the islands 22 increases, to be precise in the form that the diameter of the respective circle increases. While the number of islands per row is constant (apart from the upper three rows, in which the transitional region is rounded off on the outside in an arcuate form), the proportion made up of free regions increases as a result of the increasing size of the islands 22 in the direction of the heating area or viewing area (A). Altogether, therefore, the transparency of the transitional region 15 increases continuously from the opaque edge strip 6 towards the viewing area (A). The effective electrical surface resistance increases to the same degree, since the conductive conducting regions decrease in their surface area. The conductivity in the transitional region 15 is consequently reduced at its lower edge 19, to be precise with respect to the conductivity of a very low-impedance bus bar to which the transitional region 15 is connected at its upper edge. However, the effective surface resistance is also still lower at the edge 19 of the transitional region 15 than the surface resistance of the heating area coating in the region of the viewing area (A). Consequently, the effective electrical spacing of the bus bars, which are located under the edge strips 6 and 7 provided in the form of a black print, is reduced by the transitional regions 15 and 16, the reduction taking place with a conductor structure that is printed in the transitional regions 15 and 16, has the appearance of the known sun visor arranged in the upper transitional region 15 or a so called band filter, familiar in this place, and is therefore accepted by buyers and users of automobiles.

The structure of the printed conducting regions in the transitional regions 15 and 16 can also be envisaged as these regions being made up of a multiplicity of conductor paths 31 running parallel to one another and running parallel to the centre line 14, connected by transverse paths 32. The conductor paths 31 have a meandering shape and respectively delimit alternately one island 22 of a row on the right-hand side and one island 22 in an adjacent row on the left-hand side, arranged offset by half the width of an island. Adjacent conductor paths 31 overlap in the region between two islands 22 in one row and then, by moving apart from each other, form a bulge (island 22) in the respectively adjacent rows, to then overlap to the greatest extent again in the next rows. The print pattern in the transitional region 15 can also be envisaged as an inverted dot pattern, the dots in the present case being formed by the islands 22, which increase continuously in their size towards the lower edge 19, i.e. towards the viewing areas (8) and (A), and in the last row merely leave conductor paths with a width of about 0.3 mm.

An alternative conductive structure is graphically represented in FIG. 3. The islands 22' here have the form of a regular hexagon. The size of these hexagons decreases continuously from the lower edge 19 of the transitional region 15' towards the upper edge strip 6, produced in black print. The conductor paths remaining between adjacent islands 22' have the form of zigzag lines, the peaks of the zigzag lines being flattened on both sides and replaced by straight pieces in the longitudinal direction of the conductor path.

The current flow within the window 1 consequently takes place from a connection point that is known from the prior art to the upper bus bar, located on "side 3" of the window, via the conducting regions electrically contacted with the said bus bars in the transitional region 15, 15' to the heating coating in the viewing areas (B) and (A). Both the conductive structures in the transitional region 15, 15' and the coating in the viewing areas (B) and (A) are located on "side 2" of the window 1, 1'. On the opposite, lower side of the heating area 21, the current flow takes place through the conductive structures of the lower transitional region 16, from there into the lower bus bar on "side 3", covered by the black print in the lower edge strip 7, and from there via a contacting point back to the voltage supply.

For design reasons, printing of the window with the electrically conductive screen printing paste "thinning out" towards the viewing areas (B) and (A) may also take place in the two edge strips 23, 24 respectively running parallel to the edge strips 8, 9. To eliminate the possibility of short-circuits in these regions, preventing sufficient current flow through the heating area 21 formed by the coating in the viewing areas (B) and (A), the conductive print in the edge strips 23, 24 is on "side 2" of the coating, so that there is no electrically conductive connection of the edge strips 23, 24 to the transitional regions 15, 16 on account of the separation by the PVB film.

A window 1, represented in FIGS. 4 and 5 are similar to window 1, represented in FIG. 1. The window of a passenger car has an upper edge 2, a lower edge 3, facing a bonnet, and two edges 4 and 5, facing lateral A pillars. Starting from all the edges 2 to 5, the window 1 has in each case edge strips 6, 7, 8 and 9, which respectively have a width 10, 11, 12 and 13, the width 11 being the greatest in the region of a centre line 14 and decreasing in the direction of the edge strips 8 and 9.

The free regions are provided in the form of approximately circular islands 22, which are arranged in rows parallel to one another. In FIG. 4 with increasing distance of the rows respectively running from the centre line 14 to the edges 4 and 5 of the window 1 the size of the islands 22 increases, to be precise in the form that the diameter of the respective circle increases. While the number of islands per row is constant, the proportion made up of free regions increases as a result of the increasing size of the islands 22 in the direction of the edges 4 and 5. Altogether, therefore, the transparency of the transitional region 15 increases continuously from the centre line 14 to the edges 4 and 5. The effective electrical surface resistance increases to the same degree, since the conductive conducting regions decrease in their surface area. The conductivity in the transitional region 15 is consequently reduced at the edges 4 and 5.

In FIG. 5 with increasing distance of the rows respectively running from the centre line 14 to the edges 4 and 5 of the window 1 the size of the islands 22 decreases, to be precise in the form that the diameter of the respective circle decreases. While the number of islands per row is constant, the proportion made up of free regions decreases as a result of the decreasing size of the islands 22 in the direction of the edges 4 and 5. The decrease of the size of the islands 22 reaches a maximum at the half distance between the centre line 14 and the edges 4 and 5. Then the size of the islands 22 increases, to be precise in the form that the diameter of the respective circle increases to the edges 4 and 5 of the window 1. The effective electrical surface resistance increases to the same degree, since the conductive conducting regions decrease in their surface area.

The invention claimed is:

1. A transparent window, comprising:

an electrically heatable coating, which extends over a substantial part of a viewing area of the window, two mutually opposite low-impedance bus bars electrically connected to the electrically heatable coating in such a way that, after an electrical feed voltage has been applied to the bus bars, a current flows between them over a heating area formed by the coating, and a transitional region between the bus bars and the heating area, wherein the transitional region is at least partly light-transmitting;

wherein the transitional region has a surface resistance that (a) is lower than a surface resistance of the coating, and (b) increases in a direction from an assigned bus bar to the heating area;

wherein the transitional region comprises transparent, electrically nonconducting or poorer conducting free regions formed as islands that are completely electrically enclosed by opaque electrically conducting regions; and wherein the conducting regions have a plurality of conductor paths, which are connected in an electrically conducting manner at one end to the bus bar and at least at an opposite end to the coating.

2. The window according to claim 1, wherein at least one transverse path is arranged between adjacent conductor paths and connected to them in an electrically conducting manner.

3. The window according to claim 1, wherein a width of the conductor paths decreases from the assigned bus bar to the heating area.

4. The window according to claim 1, wherein the conductor paths run in a meandering or zigzag form and in peak or crest portions are connected in an electrically conducting manner to peak or crest portions of adjacent conductor paths that follow a mirror image path.

5. The window according to claim 1, wherein a size of the islands increases from zero at a border with the assigned bus bar continuously with increasing distance from the assigned bus bar, such that a width of the conductor paths at a border with the heating area is 0.2 mm to 10 mm.

6. The window according to claim 5, wherein the width of the conductor paths at the border with the heating area is at most between 3% and 20% of a width of adjacent islands.

7. The window according to claim 1, wherein the at least one transitional region further comprises an electrically conductive, transparent coating.

8. The transparent window of claim 1, wherein the surface resistance of the transitional region increases at least in a middle around a center line and in a region of at least one of the edges.

9. The window according to claim 1, wherein the free regions have a circular shape.

10. The window according to claim 9, wherein the conducting regions have a plurality of conductor paths, which are connected in an electrically conducting manner at one end to the assigned bus bar and at least at an opposite end to the coating, and wherein at least one transverse path is arranged between adjacent conductor paths and connected to them in an electrically conducting manner.

11. The window according to claim 10, wherein a width of the conductor paths decreases from the assigned bus bar to the heating area.

12. The window according to claim 10, wherein the conductor paths run in a meandering or zigzag form and in peak or crest portions are connected in an electrically conducting manner to peak or crest portions of adjacent conductor paths that follow a mirror image path.

13. The window according to claim 10, wherein a size of the islands increases from zero at a border with the assigned bus bar continuously with increasing distance from the assigned bus bar, such that a width of the conductor paths at a border with the heating area is 0.2 mm to 10 mm.

14. The window according to claim 1, wherein the free regions have a hexagonal shape.

15. The window according to claim 14, wherein the conducting regions have a plurality of conductor paths, which are connected in an electrically conducting manner at one end to the assigned bus bar and at least at an opposite end to the coating, and wherein at least one transverse path is arranged between adjacent conductor paths and connected to them in an electrically conducting manner.

16. The window according to claim 15, wherein a width of the conductor paths decreases from the assigned bus bar to the heating area.

17. The window according to claim 15, wherein the conductor paths run in a meandering or zigzag form and in peak or crest portions are connected in an electrically conducting manner to peak or crest portions of adjacent conductor paths that follow a mirror image path.

18. The window according to claim 15, wherein a size of the islands increases from zero at a border with the assigned bus bar continuously with increasing distance from the assigned bus bar, such that a width of the conductor paths at a border with the heating area is 0.2 mm to 10 mm.

19. The window according to claim 1, wherein the central viewing area is not covered by the transitional region.

* * * * *